Figure 1:
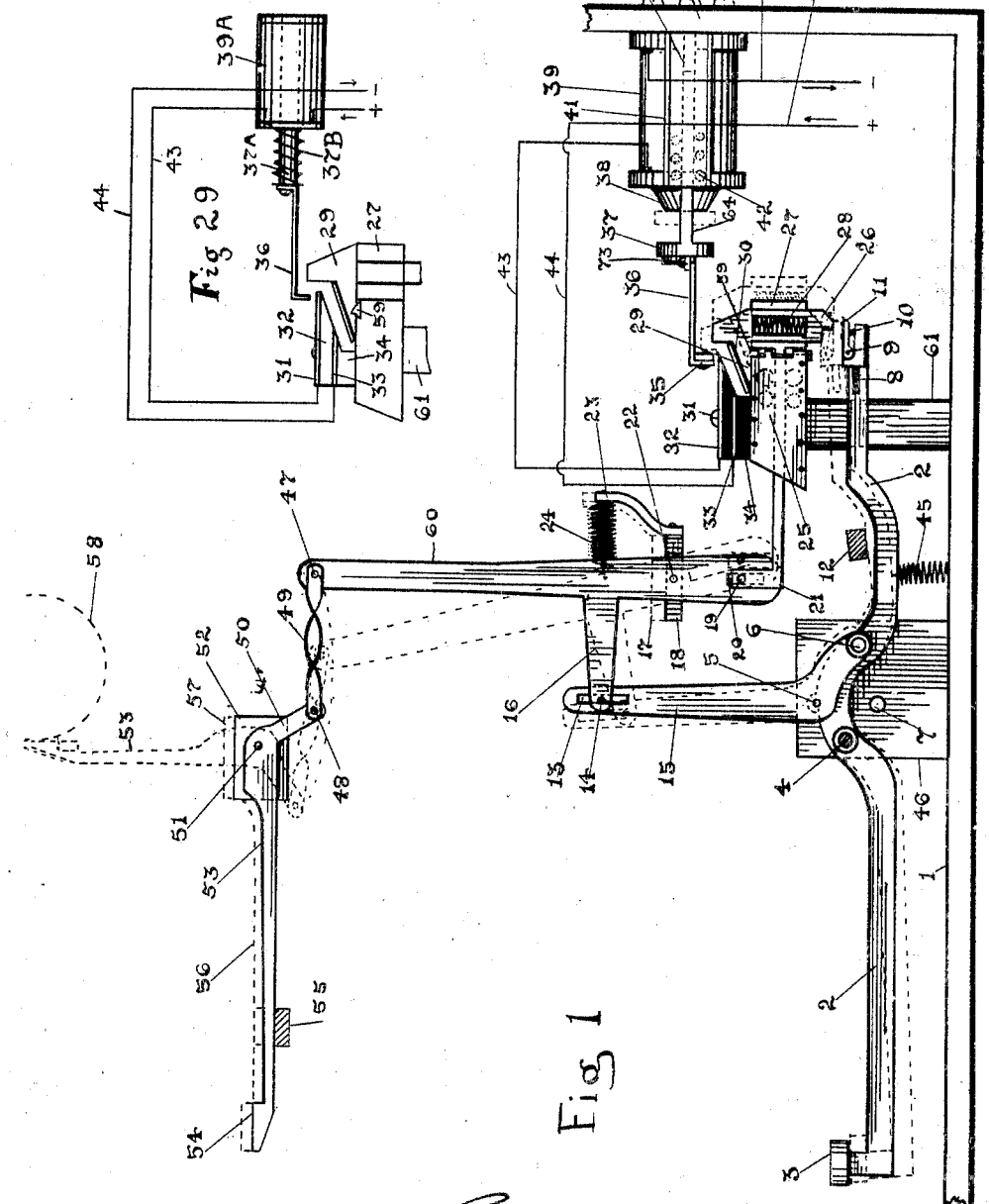

No. 777,027. PATENTED DEC. 6, 1904.
G. M. KITZMILLER.
CONVERTIBLE ELECTRIC TYPE WRITING MACHINE.
APPLICATION FILED JAN. 23, 1904.
NO MODEL. 7 SHEETS—SHEET 1.

Witnesses
J. X. Drummond.
W. R. Cook.

George M. Kitzmiller, Inventor
By Walter B. Burrow, Attorney

No. 777,027. PATENTED DEC. 6, 1904.
G. M. KITZMILLER.
CONVERTIBLE ELECTRIC TYPE WRITING MACHINE.
APPLICATION FILED JAN. 23, 1904.
NO MODEL. 7 SHEETS—SHEET 2.

No. 777,027. PATENTED DEC. 6, 1904.
G. M. KITZMILLER.
CONVERTIBLE ELECTRIC TYPE WRITING MACHINE.
APPLICATION FILED JAN. 23, 1904.
NO MODEL. 7 SHEETS—SHEET 3.

No. 777,027. PATENTED DEC. 6, 1904.
G. M. KITZMILLER.
CONVERTIBLE ELECTRIC TYPE WRITING MACHINE.
APPLICATION FILED JAN. 23, 1904.
NO MODEL. 7 SHEETS—SHEET 5.
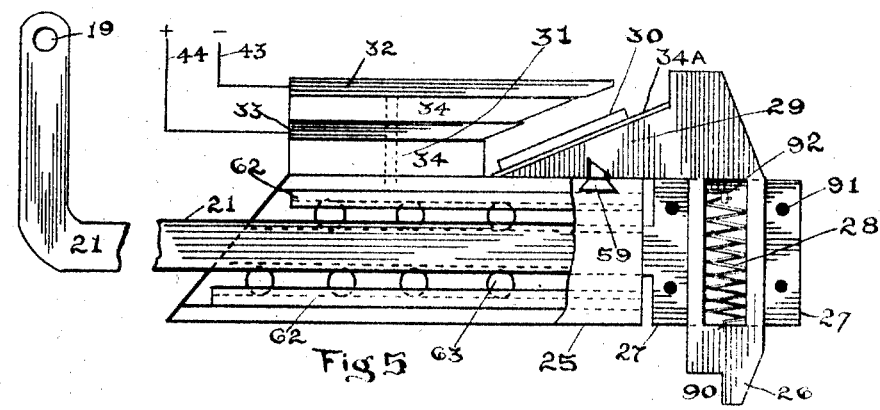
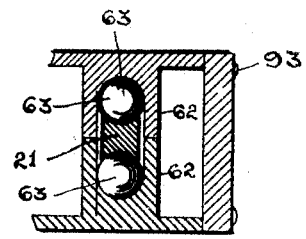
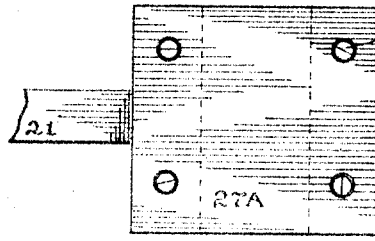
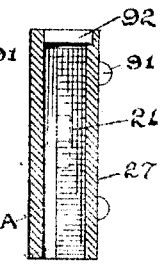
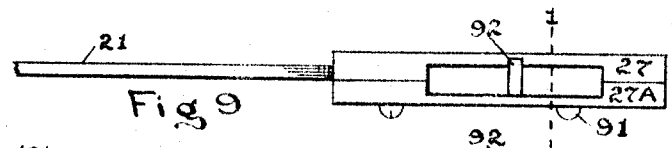
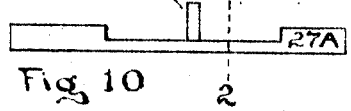
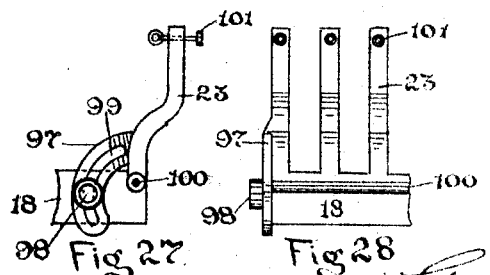
George M. Kitzmiller, Inventor
By Walter B. Burrow, Attorney
Witnesses
W. R. Cook, No. 777,027. PATENTED DEC. 6, 1904.
G. M. KITZMILLER.
CONVERTIBLE ELECTRIC TYPE WRITING MACHINE.
APPLICATION FILED JAN. 23, 1904.
NO MODEL. 7 SHEETS—SHEET 6.

George M. Kitzmiller, Inventor

Witnesses
W. R. Cook.

By Walter B. Burrow, Attorney

No. 777,027. PATENTED DEC. 6, 1904.
G. M. KITZMILLER.
CONVERTIBLE ELECTRIC TYPE WRITING MACHINE.
APPLICATION FILED JAN. 23, 1904.
NO MODEL. 7 SHEETS—SHEET 7.
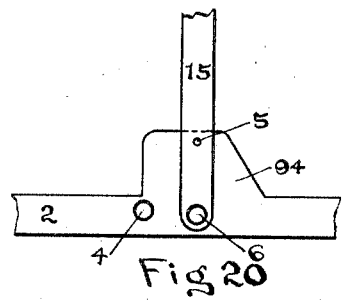
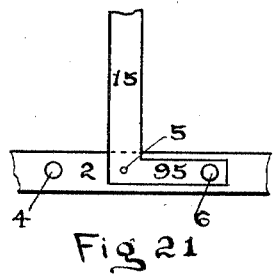
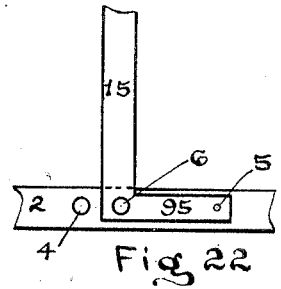
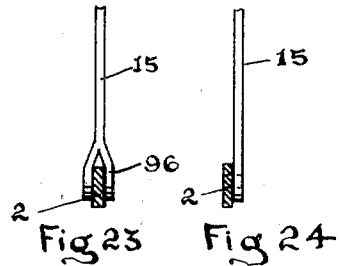
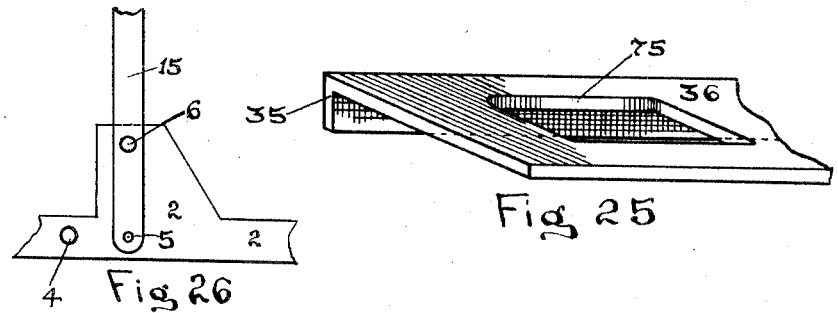

No. 777,027.                                                    Patented December 6, 1904.

UNITED STATES PATENT OFFICE.

GEORGE M. KITZMILLER, OF NORFOLK, VIRGINIA, ASSIGNOR TO THE ELECTRIC TYPEWRITER COMPANY, OF NORFOLK, VIRGINIA, INCORPORATED.

CONVERTIBLE ELECTRIC TYPE-WRITING MACHINE.

SPECIFICATION forming part of Letters Patent No. 777,027, dated December 6, 1904.

Application filed January 23, 1904. Serial No. 190,376. (No model.)

*To all whom it may concern:*

Be it known that I, GEORGE M. KITZMILLER, a citizen of the United States, residing at Norfolk, in the county of Norfolk and State of Virginia, have invented certain new and useful Improvements in Convertible Electric Type-Writing Machines; and I declare the following to be a full, clear, and exact description of the invention, such as will enable others skilled in the art to which it appertains to make and use the same.

My invention relates to type-writing machines in general, but particularly to what is known as "front-strike" machines, which can be both electrically and non-electrically operated.

The advantage of my type-writing machine is that in the event of a cessation of the source of electric current it can be transformed or converted immediately into an ordinary key-lever-actuated machine without inconvenience. This transformation or conversion can be accomplished by the operator. Also it can be similarly converted to an electrically-operated machine in a few moments by simply inserting a pin or rod through the key-levers and vertical levers, as will be hereinafter explained. A further advantage is that my machine used electrically may be operated at a much higher rate of speed, together with the advantage that one key does not have to be released by the finger before another key is struck or depressed, but one or more keys may be held down and additional ones struck without interfering with the operation of the machine.

Figure 2:
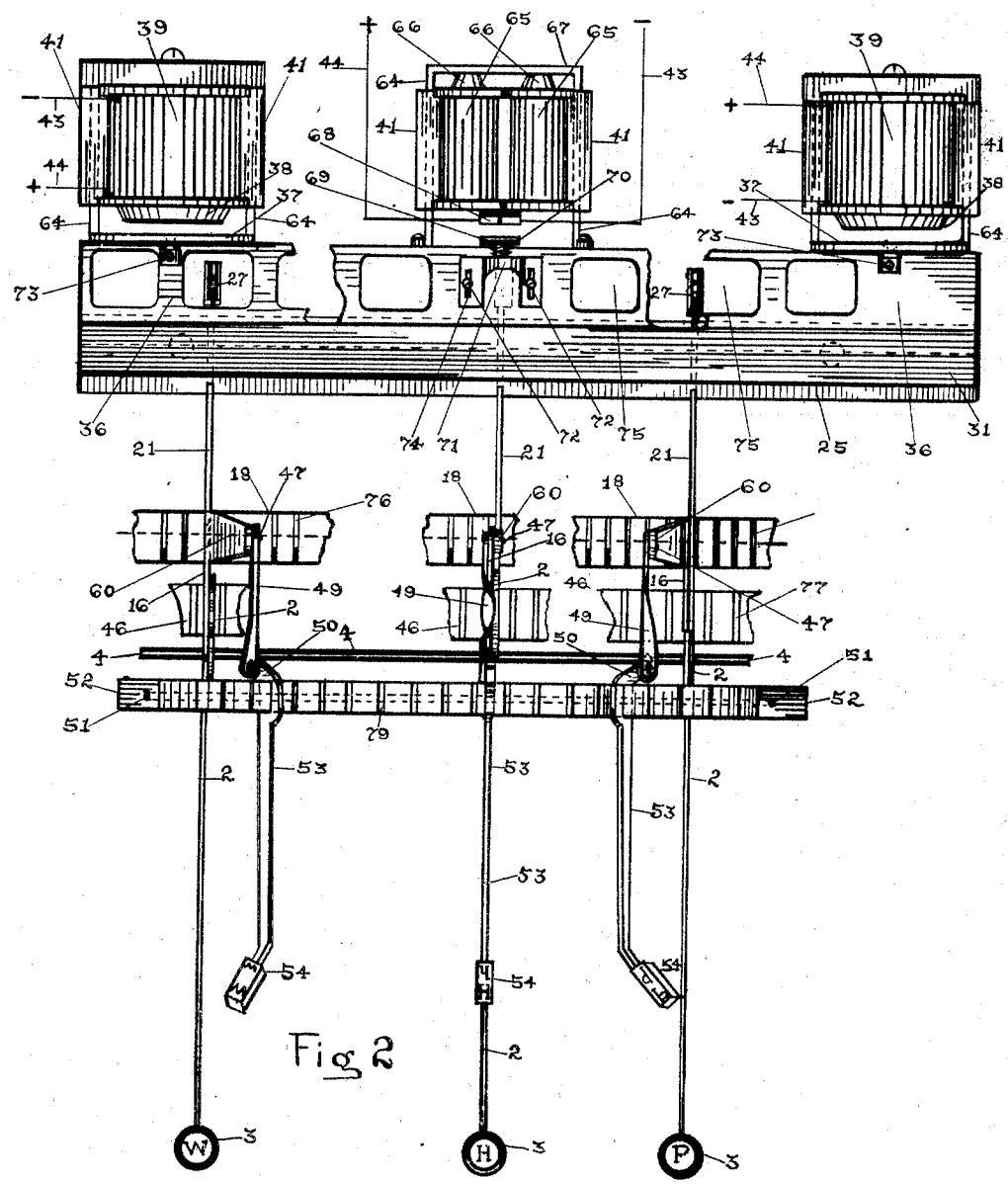
Figure 3:
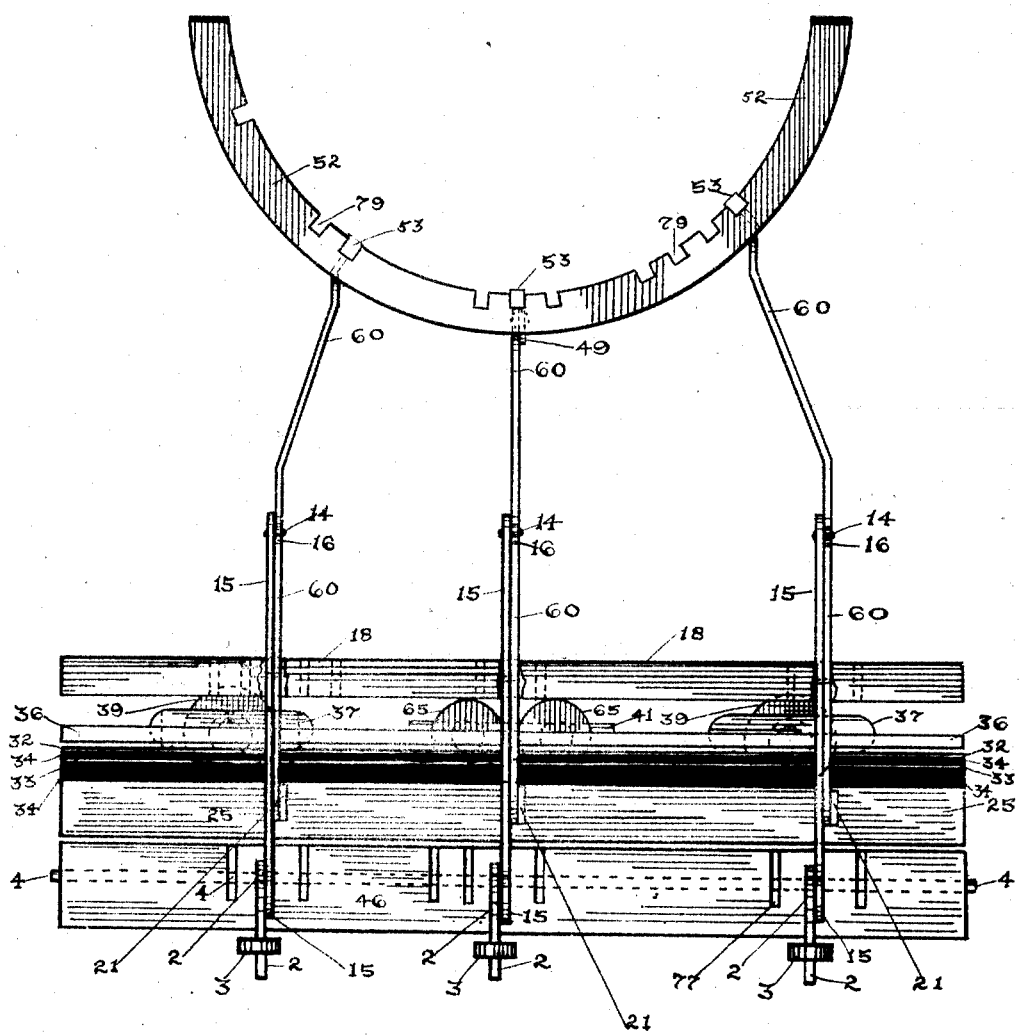
Figure 4:
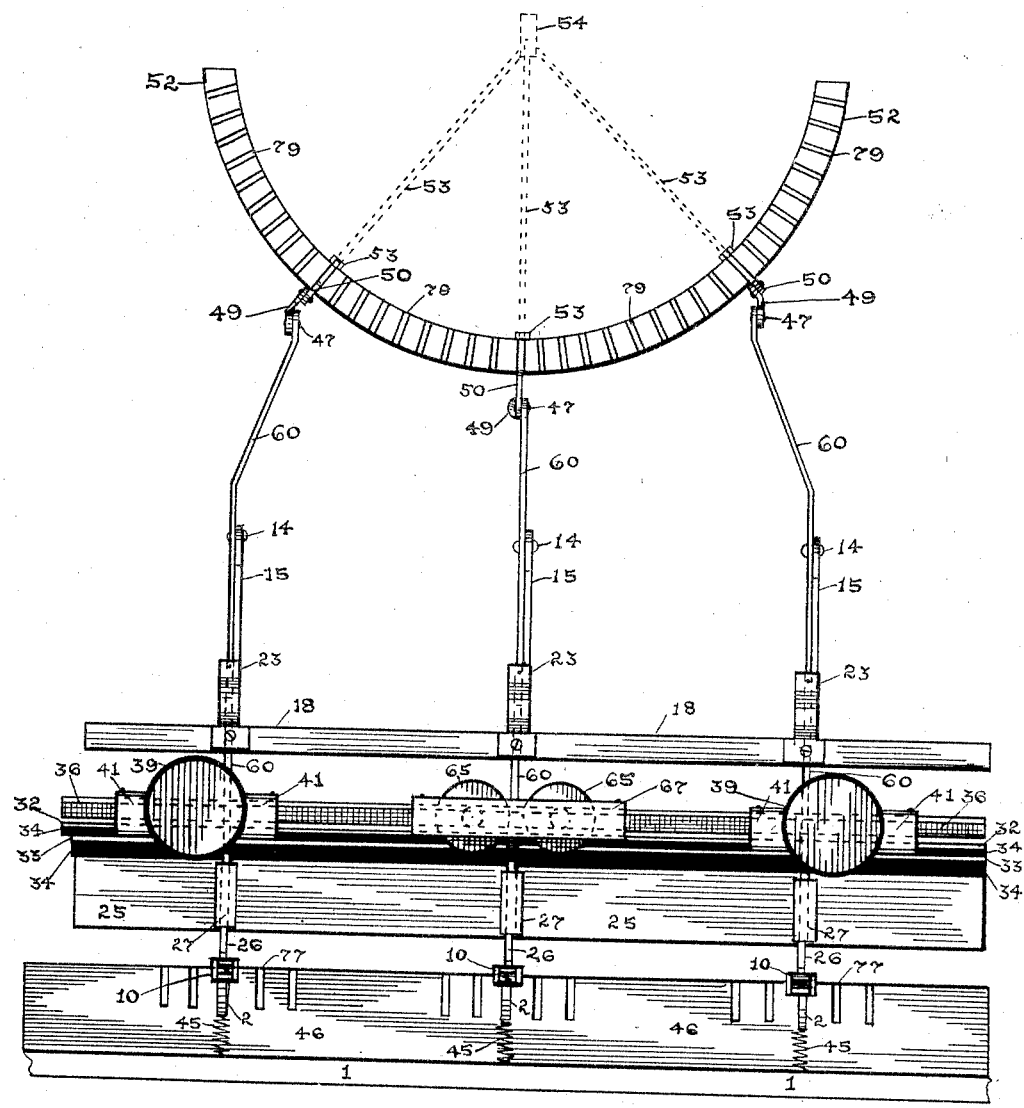
Figure 11:
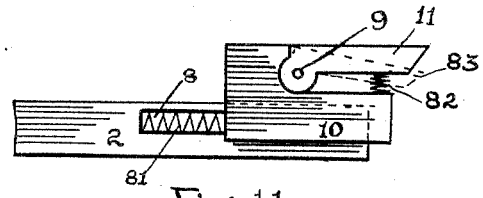
Figure 12:
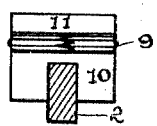
Figure 13:
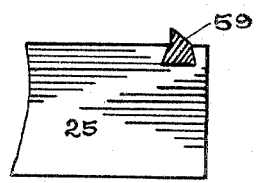
Figure 14:
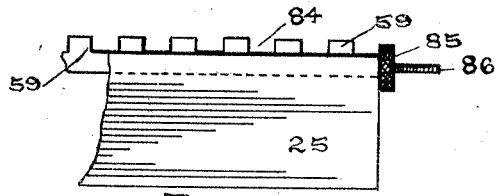
Figure 15:
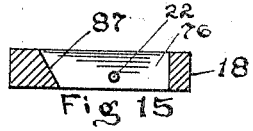
Figure 17:
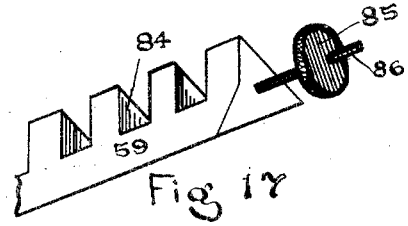
Figure 16:
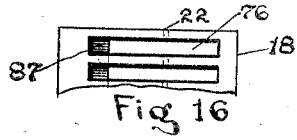
Figure 18:
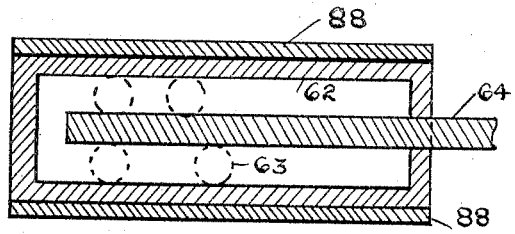
Figure 19:
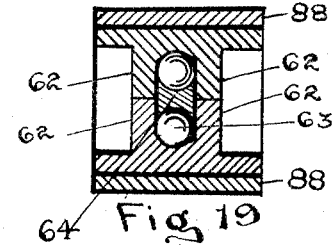

In the drawings, Figure 1 is an elevation of one set of the key-levers and the other operating mechanism with the parts not pertinent to the invention omitted. Fig. 2 is a plan showing three sets of key-levers and their combined mechanism. Fig. 3 is a front elevation of the machine, also showing three sets of key-levers. Fig. 4 is a rear elevation of the machine. Fig. 5 is an elevation, partly in section, of the plunger-bar guide. Fig. 6 is a side elevation of the slotted cross-head on the plunger-bar. Fig. 7 is a cross-section on the line 1 2 in Figs. 9 and 10. Fig. 8 is a cross-section of the guide for the plunger-bar. Fig. 9 is a plan of the plunger-bar and cross-head. Fig. 10 is a plan of the plate or cover of the cross-head. Fig. 11 is an elevation of the stump-joint or spring-tongue. Fig. 12 is an end view of same. Fig. 13 is a part elevation of the guide, showing the latch. Fig. 14 is a front view of the same. Fig. 15 is a cross-section of the type-bar-lever support. Fig. 16 is a part plan of the same. Fig. 17 is a perspective of the latch-bar and adjusting-screw. Fig. 18 is a sectional elevation of the guide for the magnets. Fig. 19 is a cross-section of the same. Figs. 20, 21, 22, and 26 are a modified form of the key-lever and vertical lever. Figs. 23 and 24 are cross-sections of the same. Fig. 25 is a perspective view of the hooked channel-plate. Fig. 27 is a side and Fig. 28 is a rear elevation of the type-bar-lever spring-support and adjusting-screws. Fig. 29 is an elevation of a modification where a solenoid is used in place of electromagnets for operating the hooked channel-plate.

In the drawings like reference-numbers indicate corresponding parts throughout the several drawings.

1 is a part of the frame of the machine. All other parts not relating to my invention have been omitted.

2 is a key-lever, shown on the drawings, having an arch; but I am not confined to the construction as such, as I may use the modifications as shown in Figs. 20, 21, and 22.

3 is a key of the ordinary construction suitably lettered or numbered.

4 is an aperture for a fulcrum-point of the key-lever 2 when the machine is to be electrically operated.

5 is the pivot of the lever 15, which will be hereinafter described.

6 is the aperture for the fulcrum-point when the machine is to be non-electrically operated.

7 is an aperture for supporting the pin or rod when not in use.

8 is a horizontal slot in one end of the lever 2 for securing a spring to actuate the sliding block 10 and the tongue 11.

9 is the pivot or joint for the tongue 11 in the sliding block 10. The construction of the stump-joint 9 allows the tongue 11 to open only downward, being prevented from rising by a shoulder, as shown in Fig. 11. The tongue is held in normal or horizontal position by suitable means, preferably by a spring, as at 82 in Fig. 11.

12 is a stationary check-bar to prevent the key-lever from being lifted too high.

15 is a vertical lever slotted at its upper end, as at 13. This lever is pivoted to the key-lever at 5 and also secured at 6 when the machine is non-electrically operated, in which case it becomes integral or rigid with the said key-lever. When electrically operated, it is released from the fulcrum-point 6 and then oscillates upon its pivot 5, having no function to perform in the operation of the machine.

60 is a vertical type-bar lever between the lever 15 and the key-lever end, as at 10, and is placed above it more or less, the upper and lower ends of the said type-bar lever being in a vertical plane and bent between its fulcrum and its upper end more or less, as shown.

16 is an arm or offset carrying a pin 14, the said arm being a part of and at right angles to the lever 60 and gets its motion from the lever 15 when it is pinned in the aperture at the fulcrum-point 6 for non-electric operation. The lever 60 is pivoted at 22 by means of the angular slotted bar extending across the machine, as shown at 18, also on an enlarged scale in Figs. 15 and 16, and is connected to a suitable shifting arrangement which brings it to the position as shown by the dotted lines 17.

19 is a pivot actuating the lever 60 by means of the hooked or plunger bar 21 and works in the slot 20 on the lower end of the lever 60 and below its fulcrum, as shown.

21 is a hooked slotted-head plunger-bar or draw-bar engaging in slot 20 of the lever 60 by the pin 19.

22 is a rod or pin fulcrum for the lever 60.

23 is a curved arm located on the shifting cross-bar 18 for supporting the spring 24 and has for its object the maintenance of the normal position of the type-bar lever. The curved arm 23 is adjustable, so as to increase and decrease the tension of the spring 24, which is stronger when the machine is electrically operated, owing to the greater rapidity of the return of the type-bar after the printing stroke. Figs. 27 and 28 show a part of the support for the lever 60 and this curved spring supports arm 23, which are behind each type-bar lever.

In Figs. 27 and 28, 97 is a curved slotted quadrant which is held in any position desired by the nut 98.

99 is the curved slot.

100 is the pivot which is general for all the levers or spring-supports 23.

101 is a screw and ring for attachment and adjustment of the spring 24.

The arm or supports 23 are connected together at their lower ends, as shown in Fig. 28. All of the supports 23 are adjusted together by the nut 98 and the slotted quadrant 99. The individual adjustment is accomplished by the screws 101 in the curved arm 23 in Figs. 27 and 28, connected to the spring 24, as shown in Fig. 1.

25 is a ball-bearing guide supported, as at 61 or by other suitable means, to the frame of the machine. The guide 25 has concave tracks and flanges, as shown at 62 in Fig. 8, for supporting the balls 63 and inclosing them. The rod 21 has a concave cross-section, as shown in Fig. 8 at 21.

26 is a vertically-movable slotted pendant or circuit-closing device having a notched corner 90 at its lower end, as shown in Fig. 1 and on an enlarged scale in Fig. 5. The foot or circuit-closer 26 is movably supported in a slotted T or cross-head 27, forming a part of the hooked plunger-bar 21, in the opening shown in the plan in Fig. 10, in section at Fig. 7, and by dotted lines in Fig. 6. The foot or circuit-closer is maintained in position by means of the cover 27$^A$, (and spring 28,) correspondingly slotted to conform to the shape of the circuit-closer 26, and is secured in place by the screws 91. The cover 27$^A$ has a lug or pin 92 secured thereto, which coincides with a notch in the main body of the head or block 27, as shown in Figs. 7, 9, and 10. Fig. 10 shows the cover drawn apart, while in Figs. 7 and 9 they are together.

The pin or lug 92 is for the purpose of forming a stationary point for the spring 28, the lower end of the spring being affixed to the lower portion of the slot in the circuit-closing foot, as indicated in Fig. 6. The action of the spring 28 is one of compression and keeps the foot 26 down upon the cross-head or block 27 and also on the end of the ball-bearing plunger-bar guide 25.

29 is the wedge-shaped or triangular inclined upper portion of the foot 26, having a lining of insulation upon it, as shown at 34$^A$ in Fig. 5. Upon the insulation there is placed a piece of copper or other metal, as at 30, Figs. 1 and 5.

31 is a screw for securing the terminal contact plates or bars 32 and 33 to the guide 25.

32 and 33 are copper or other metallic terminal contact plates or bars, insulated from each other, extending across the machine, secured to the guide 25 by screws 31, and have a wedge-shaped triangular or inclined projection whose hypotenuse is parallel with that assumed by the front upper portion or angle of the foot or circuit-closer 26. These plates or bars are supplied with the electric current by means of the wires 43 and 44.

35 and 36 represent a perforated hooked plate, 36 being the plate, and 35 is the hooked or upset portion. This plate is fastened to the armatures 64 of the magnets 39, and which when charged with the electric current draws the armatures toward the cores 38 of the magnets and with them the hooked plate 36, which engages the upper projection of the circuit-closing foot 26 by the hook 35 and draws the block or head 27 to the position shown by dotted lines in Fig. 1, which in turn actuates the type-bar lever 60.

I am not confined to the use of electromagnets, as I may use a solenoid, as shown in Fig. 29, in which view 39$^A$ is the solenoid, 37$^A$ is the core, and 37$^B$ is a spring for maintaining the core in its normal position. When a solenoid is used, the return-stroke magnet is omitted in the construction of my machine.

41 represents armature-guides placed on each side of the magnets 39 and 65. These guides have concave tracks, as shown at 62, Figs. 18 and 19, which also form extensions or flanges which inclose the balls 63 for the purpose of preventing them from falling out. The rods or spindles 64 also conform to the shape and size of the balls, and therefore have two concave faces, as shown in section in Fig. 19. These guides have suitable covers 88. Fig. 18 is a sectional elevation, and Fig. 19 is a cross-section, of the armature guide-rod. Fig. 8 is a cross-section of the main plunger-rod guide 25, which is of a similar construction to those shown in Figs. 8, 18, and 19. Figs. 6, 7, 9, and 10 are detail views of the plunger-rod and head or block, 6 being an elevation, 7 a cross-section in the line 1 2 of Figs. 9 and 10, the two latter being a plan and part plan, respectively, as has been already described. Fig. 5 is a part elevation and sectional elevation of the plunger-rod guide, plunger-rod, and the slotted head 27 and block, also the circuit-closing foot 26 and the insulated terminal contact plates or bars. Fig. 25 is a larger view in perspective of the hooked plate 36, showing the hooked portion 35 and its openings 75, which render the plate lighter.

42 in Fig. 1 shows the portion of the spindles and at 64 by dotted lines.

43 and 44 are wires from a suitable electric source supplying the magnets 39 and 65, also the terminal contact-plates 32 and 33, with the current.

45 is a spring acting by extension in order to keep the key-lever 2 in its normal position for working.

46 is a block secured to the frame 1 of the machine for supporting the key-levers 2. This block or bar extends across the machine and is provided with slots for the reception of the key-levers and also has apertures 4, 6, and 7, those at 4 forming a fulcrum when the machine is to be electrically operated, while those at 6 are used when it is desired to operate if non-electrically, 7 being an aperture for placing the pin 4 when not in use.

47 is a pivot or joint at the top of the type-bar or offset lever 60, which connects with the type-bar arm 50 and joint 48 by means of a twisted link 49. This link is shown twisted one revolution, so that both ends of same, as at 47 and 48, are in the same vertical plane as the lever 60 is shown in the center of the type-bar supporting ring or basket 52, Figs. 2, 3, and 4. When the levers 60 are farther from the center, as shown in Fig. 2 or Fig. 4, they assume different angles, so that the levers 60 near their fulcrum 14 and their upper ends, as at 47, Fig. 4, are parallel with each other. Therefore in order to connect the parallel upper ends of the levers 60 with the type-bar arms 50 I use a link one end of which is parallel with the lever 60 and the other end twisted at such an angle as to match that taken by the type-bar arms 50 and which is curved by the circle 52 of the type-bar ring or basket. The links have various angles, according to the diameter of the ring 52 and other conditions. The twisted link, as shown in Figs. 1 and 2, has greater strength and greater rigidity than it would have if it were of the ordinary construction.

51 is a rod in the ring 52 for supporting the type-bars 53 and also forms their fulcrums.

54 is the end of the type-bars to which the type is secured.

55 is a rest for the type-bars when not in use.

56 and 57 are dotted lines showing position of the type-bars and rim or basket when elevated in order to print in upper case, as is ordinarily done.

58 is the platen or paper-roller on which the type-bar head or end 54 strikes in order to make an impression.

59, Fig. 1, is a latch or dog. (Shown on a larger scale in Figs. 13, 14, and 17, Fig. 13 being a part elevation, Fig. 14 an end elevation, and Fig. 17 a front view in perspective.) The latch or locking mechanism extends across the machine and consists of a toothed bar with ratchet-teeth 59 and open spaces 84, the toothed bar being dovetailed in the plunger-rod guide 25 at or near its end. When the machine is electrically operated, the latch-teeth 59, Fig. 14, engage with the horizontal portion of the triangular or wedge-shaped portion of the circuit-closing foot 26, locking it firmly to the guide 25 until lifted and released by the sliding block 10 on the end of the key-lever 2. When the machine is non-electrically operated, the teeth of the latch 59 are replaced by the spaces 84, so that the circuit-closer 26 passes between the teeth without action, for the reason that the machine operated non-electrically has the action of all the combined levers, and hence the type-bars would not be so liable to vibrate as when the machine is electrically operated. The latch 59 is adjustable in the direction of the width of the machine by means of the screw 86 and the circular milled nut 85.

65 represents return-stroke electric magnets or solenoids and are for the purpose of returning the hooked plate 36 quickly toward the magnets 39, (their normal position,) thus making the complete stroke of the plate very rapid.

66 represents the iron cores of the magnets 65.

67 is the armature, which is placed on the opposite end to the magnets 39.

68 represents copper blocks or plates suitably insulated, which are connected to an electrical source by means of the wires 43 and 44.

69 is a copper contact circuit-closing plate, insulated from the plate 36 by the insulation 70.

71 is a slotted cross-head supporting the circuit-closer 69 and 70 and provided with a spring which acts by compression. The cross-head 71 is adjusted by means of the slots 74 and the screws 72. The stroke of the hooked bar or plate 36 can be varied by moving the slotted cross-head or block 71 in or out, so as to lengthen or shorten the circuit-closing plate 69, which causes a greater or less movement of the plate 36 to effect a contact. Therefore the nearer the contact plate or block 68 is to the plate 69 the earlier the circuit will close, and the farther they are apart the reverse is the case. When the magnets 39 draw the plate 36 toward them, the contact 69 and 70 is brought to the terminal 68, which closes the circuit and renders the magnets 65 operative.

73 represents lugs for securing the hooked plate 36 to the main magnet-armatures 37 and also providing means for increasing and decreasing the distance of the armatures from the magnet-cores.

Figs. 15 and 16 are enlarged views of the angular slotted bar 18, Fig. 15 being a cross-section and Fig. 16 a plan.

22 is the pivot for the lever 60, 76 being the slot and 87 the angular end of the opening or slot.

77 represents the slots in the key-lever support-bar 46.

79 represents the slots for the type-bars 53.

Figs. 11 and 12 are enlarged views of the sliding block 10 and the downward-opening tongue 11, which is slotted to receive one end of the key-lever 2. The spring 81 is for the purpose of maintaining the block 10 outward on the end of the key-lever 2. The spring 82 is for keeping the tongue 11 horizontal or in its normal position, as shown. This spring is stronger than the one in the slotted circuit-closing foot 26, as at 28.

83 (shown by dotted lines) is the position assumed by the tongue 11 when releasing the circuit-closer 26 while lifting it. The tongue 11, as shown at 83, allows the lower end of the circuit-closer 26 to slip off quickly, which is assisted by the notched corner 90 on the lower end of the foot 26.

Figs. 20, 21, 22, and 26 show modifications of the fulcrum-points on the key-lever 2 and of the vertical lever 15. Fig. 20 shows the position of the fulcrum-points 4 and 6, and the pivot 5 is nearly the same as that shown on Fig. 1, the difference being that the arched portion of the key-lever 2 is replaced by a block having one or more angular ends. In Fig. 21 the pivot 5 and the fulcrum-apertures 4 and 6 are in line, while the vertical lever 15 has the shape of a right angle on its lower end, as at 95, instead of curved, as shown on Fig. 1. In Fig. 21 the pivot 5 is between the apertures 4 and 6 at varying distances from each other. In Fig. 22 the two fulcrum-points are together, while the pivot 5 is near the end of the angular lower end of the lever 15, as at 95. Fig. 26 shows a block forming a part of the key-lever 2, as in Fig. 20 and shown at 94, in this view the pivot 5 connecting lever 15 below the fulcrum 6 and in vertical line with the same. The pivot 5 is in a horizontal line with the fulcrum, as shown. The fulcrum-aperture 4 is generally slightly above the aperture 6; but I am not confined to such, as I may use any modification of the same as is deemed expedient in constructing my machine.

Figs. 23 and 24 show two methods of connecting the lever 15 to the key-lever 2, Fig. 23 showing a forked or bifurcated lower end of the lever 15, as at 96, while in Fig. 24 they are side by side.

In Figs. 23 and 24 the key-lever 2 is shown in section, while Figs. 20, 21, and 22 are in part elevation.

I will now proceed to describe the operation of my invention in addition to that already explained.

When the machine is to be electrically operated, a pressure of the finger on the key 3 of the lever 2 raises its other end, as shown by dotted lines, and with it the sliding block and tongue 11. The sliding block lifts the circuit-closing shoe 26, which is disengaged from the latch or locking device 59, and continues to rise until the copper plate 30 on the triangular upper portion of the foot 26 comes in contact with the copper plates 32 and 33. When the two plates 32 and 33 are connected, the electric circuit is completed and flows from the batteries or other source of supply to the magnets. The magnets 39 being thus charged, they draw their armatures 37 to the poles 38, and with them the hooked plate 36, which pulls the circuit-closer 26 away from the guide plunger-block 25, and thus actuates the type-bar lever 60 by pulling the rod 21 outward. The motion is then transferred to the type-bar for printing in the usual manner. As already described, the position shown by the full lines in Fig. 1 after being moved to the position shown by the dotted lines, which operation is through the function of the operating-magnets 39, the spring-cushioned circuit-closer 69 and 70, carried on the hooked plate, form an electric connection with the terminal block 68 and instantaneously returns the hooked plate to normal position, and consequently breaks the circuit, the said hooked plate being ready to repeat its operation. The circuit-closer 26 is quickly released from the block 10 by the tongue 11, which assumes an incline and allows the foot 26 to slip off. The terminal contact-plates 32 and 33 and the insulation 34 extend across the machine, as do the plate 36, rod 4, and the guides 25, the terminal plates 32 and 33 being a common contact medium for all the circuit-closers 26. When the machine is electrically operated, the lever 15 is without action; but when non-electrically operated it becomes integral with the key-lever 2 and then actuates the lever 60 and plunger-rod 21, the circuit-closing foot 26 then passing between the teeth of the latch 59 and escapes the sliding block 10. Hence there is no contact made on the terminal contact-plates 32 and 33. The conversion of the machine is accomplished by inserting a rod 4, Fig. 2, in the aperture 4 for electric and in 6 for non-electric operation, another similar rod being inserted in one of the apertures while the other one is adjusted, after which one of the rods is removed. This is done to secure the proper alinement of the levers during the transfer from one aperture to the other. The slotted aperture in the lower portion of the lever 60 allows the lever to assume different angles and be raised or lowered during its operation on the pivot-pin 19, the other usual mechanism forming the part of a complete type-writing machine having been omitted and only the elements forming the basis of my invention have been shown.

I am not confined to the exact details of construction herein set forth, but may modify such parts as may be deemed expedient without departing from the subject-matter herein claimed.

Having described my invention, what I claim, and desire to secure by Letters Patent, is—

1. In a convertible electric type-writing machine, the combination comprising, a platen, a plurality of type-bars, a series of twisted links, a vertical lever, its upper and lower ends being in vertical planes and bent between its fulcrum-point and its upper end, the said lever having a projecting arm above its fulcrum-point, and an extension below its fulcrum-point provided with a slot, means for electrically operating the said vertical lever, a pivoted key-lever having changeable fulcrum-points, a plurality of apertures in the said key-lever, a vertical arm at right angles to the said key-lever and slotted at its upper end and pivoted to the said key-lever in the vicinity of its fulcrum-points, the said vertical arm being connected to the said bent vertical lever, a detachable rod or pin adapted to fulcrum the key-lever and to secure the vertical arm thereon, substantially as described.

2. In a convertible electric type-writing machine, the combination of a pivoted key-lever, having a plurality of fulcrum-points at varying distances from the end of key-lever, the apertures or fulcrum-points being in line with each other, an extension of key-lever beyond the fulcrum-points, carrying a sliding spring-cushioned slotted cross-head on end of said extension, having a spring-compressed lifting and releasing tongue, a vertical arm slotted at one end and at right angles to said key-lever, and pivoted to the said key-lever in the vicinity of the fulcrum-points of the said key-lever, and adapted to be made rigid with the key-lever when secured to one of the said fulcrum-points by a rod or pin, substantially as described.

3. In a convertible electric type-writing machine, the combination of a changeable-fulcrum key-lever, having apertures near its center for a rod or pin insertion, a sliding depressible tripping-tongue and stump-joint on one end of the said key-lever, a slotted lever at right angles to the said key-lever having an aperture at its lower end corresponding to that in the key-lever, means for rigidly securing the said vertical lever to the key-lever, a rod or pin constituting a fulcrum for the key-levers and vertical levers, a vertical slotted type-bar lever above and between the fulcrum-points and the tripping-foot on the key-lever, having an offset or arm at right angles to the said lever and above its fulcrum, the said arm engaging by a pin in a slot on the vertical lever connected to the key-lever, a hooked slotted plunger-bar or draw-rod for actuating the slotted lower end of the offset or arm of the type-bar lever and the combination of levers, insulated metal terminal contact plates or bars extending across the machine, means for supplying the said plates or bars with the current, means for forming a contact with the said plates or bars by depressing the key-lever, and electromagnets or solenoids in electrical connection with the said terminal contact plates or bars and the source of electric current for operating the said hooked slotted-head bar or rod and the type-bars and type-bar-actuating levers, as described.

4. In a convertible electric type-writing machine, the combination of a changeable-fulcrum key-lever having apertures near its center for a rod or pin insertion, a sliding depressible tripping-foot and stump-joint on one end of the said key-lever, a slotted lever at right angles to the said key-lever having an aperture at its lower end, means for rigidly securing the said lever to the key-lever at the said aperture, a pivot joining the said lever to the key-lever, a rod or pin for connecting the said lever and key-lever, a vertical type-bar lever, its upper and lower ends being in a vertical plane and bent between its fulcrum and its upper end, said vertical type-bar lever having an offset or arm at right angles to the said type-bar lever above its fulcrum, said arm engaging by a pin in a slot on the vertical lever connected to the key-lever, an extension of said type-bar lever below its fulcrum, a slotted-head plunger-bar or draw-rod for actuating the said type-bar lever, and electromagnets or solenoids for operating the said slotted-head plunger-bar or draw-rod, as described.

5. In a convertible electric type-writing machine, the combination of a variable-fulcrum key-lever, a vertical lever at right angles to the said key-lever, having a slot on its upper end, a pivot on the said vertical lever and the key-lever for securing them together, a rod or pin for connecting each fulcrum-point independently of the other, a notched or toothed beam for supporting the key-lever, the said beam having apertures corresponding to the perforations on the said levers, a horizontally-sliding depressible tripping-foot and stump-joint on the end of the key-lever, a vertical, armed or offset type-bar lever between the said fulcrum-points and the tripping-foot, the said offset or arm movably pivoted to the vertical lever on the said key-lever, and oscillating in the slot when electrically operated, means for lowering and raising the said vertical offset type-bar lever, a bar with angular slots for supporting the said offset type-bar lever, a spring for restoring the said type-bar lever to its normal position, a pivoted adjustable curved arm on the said angular-slotted bar for supporting the spring, a curved slotted arm or quadrant on the curved arm for screw adjustment of the spring tension, means for adjusting the said spring tension together or independently, a hooked slotted horizontally-movable T-head or plunger-bar for actuating the lower portion of the offset type-bar lever which extends below the fulcrum of said type-bar lever, the said hooked bar having a concave cross-section, a vertically-movable triangular-headed spring-controlled slotted circuit-closing insulated foot, the said foot sliding in the T or cross head of the hooked plunger-bar, a ball-bearing internally-convave guide for the concave hooked plunger-bar, and extending across the machine and attached to the frame thereof, and a latch or detent for securing and releasing the said triangular-headed slotted foot or circuit-closer, as described.

6. In a convertible electric type-writing machine, the combination of a variable-fulcrum key-lever, a vertical lever at right angles to the said key-lever, having a slot in its upper end, a pivot on the said vertical lever and the key-lever for securing them together, a rod or pin for connecting each fulcrum-point independently of the other, a notched or toothed beam for supporting the key-lever, the said beam having apertures corresponding to the perforations on the said levers, a horizontally-sliding depressible tripping-foot and stump-joint on the end of the key-lever, a vertical armed or offset type-bar lever above and between the said fulcrum-point and the tripping-foot, the said offset or arm movably pivoted to the vertical lever on the said key-lever, and oscillating in the slot when electrically operated, means for lowering and raising the said vertical offset type-bar lever, a bar with angular slots for supporting the said offset type-bar lever, spring-compressed means for holding type-bar lever in normal position, a hooked slotted horizontally-movable T-head or plunger-bar for actuating the lower portion of the offset type-bar lever, said lower portion being below the fulcrum thereof, the said hooked bar having a concave cross-section, a vertically-movable spring-controlled slotted circuit-closing foot having a triangular offset carrying an insulated circuit-closing plate, the said foot sliding in the T or cross head of the hooked bar, a ball-bearing internally-concave guide for the concave hooked bar and extending across the machine, and a latch or detent for locking and unlocking the said pendent or circuit-closing triangular-shaped foot, or contact-shoe, as described.

7. In a convertible electric type-writing machine, comprising a key-lever having a plurality of apertures therein, a detachable rod or pin for engaging in the said apertures, means for changing the point of fulcrum of the key-lever by the rod or pin, a slotted vertical lever having an aperture corresponding to one of the apertures in the said key-lever, a pivot connecting the said key-lever and vertical lever, a rod or pin for altering the fulcrum or leverage of the said key-lever to change from electric to non-electric control, a vertical offset or armed vertical type-bar lever above and between the fulcrum-points of the key-lever and the end thereof, a slot on the lower end of the said offset type-bar lever, a sliding cross-head on the end of the said key-lever having a depressible tongued releasing stump-joint, a hooked concave plunger-bar or draw-rod, a ball-bearing guide for the said plunger-bar, the said guide extending across the machine, a concave track for supporting the plunger-bar or draw-rod and the balls, and flanges on the said guide on the top and bottom thereof, for inclosing the balls and plunger-bar or draw-rod, a slotted head on one end of the said hooked plunger-bar or draw-rod, a wedge-shaped slotted spring-controlled foot or dog or circuit-closer, and wedge-shaped or inclined insulated electric terminal contact plates or bars extending across the machine, the wedge-shaped or angular portion of the said insulated electric terminal contact plates or bars being parallel with the top of the angular-headed circuit-closing device, a solenoid for operating the said combination of rods and levers, means for connecting the said solenoid and terminal contact plates or bars with a source of electric current, as described.

8. In a convertible electric type-writing machine, comprising a key-lever, a changeable fulcrum-point in the said key-lever, a vertical lever pivoted to the key-lever, a detachable rod or pin for forming a fulcrum for the key-lever, a vertical movable slotted arm carrying an offset or projection above, and a slot below the fulcrum thereof, a tongued depressible sliding block or cross-head at the end of the said key-lever, a concave hooked plunger-bar or draw-rod, a slotted head on the end of the said plunger-bar or draw-rod, a ball-bearing guide for the said plunger-bar, a wedge-shaped insulated contact-foot, insulated metal terminal contact plates or bars extending across the machine, means for charging the said terminal contact plates or bars with the electric current, a slotted spring-controlled circuit-closing foot, an insulated shoe on the said circuit-closing foot, means for making an electrical contact with the said terminal contact plates or bars by means of the said shoe, a perforated hooked or channel plate extending across the machine and adapted to engage the portion extending above the contact-shoe of the circuit-closing device, when the wedge-shaped head or contact-shoe is raised on the plunger bar or rod, for actuating the levers and the type-bars, armatures extending across the machine and concave rods attached to the said channel, or hooked plate, and the armatures, and ball-bearing guide-boxes for the operation of the said arms and electromagnets, in electrical circuit with the said terminal contact plates or bars and the source of current for making and breaking the circuit for actuating the said hooked plate and the armatures, as described.

9. In a convertible electric type-writing machine, the combination with a key-lever having a changeable fulcrum-point, a vertical lever adapted to be independent of or rigid with the fulcrum-points of the said key-lever, a rod or pin to secure the said vertical lever to one of the apertures in the said key-lever when the machine is to be non-electrically operated, a yieldable tongue for making an electrical contact for operating electrically, means for throwing the said tongued device out of contact when the machine is non-electrically operated, a vertical type-bar-actuating lever carrying an arm or offset at right angles thereto, a hooked concave bar or rod having a slotted head, a ball-bearing guide for the said headed bar or rod, a key-lever-actuated wedge-shaped slotted foot or circuit-closer, a hooked plate for disengaging the said circuit-closer after making a contact, wedge-shaped projecting insulated terminal contact-plates corresponding to the shape of the circuit-closer, a double-spindle armature, the said spindles working in concave ball-bearing guides, a plurality of electromagnets for operating the said armature in the guides, an adjustable wedge-shaped dovetailed latch-bar having ratchet-teeth therein, the said latch-bar extending across the machine, the said ratchet-teeth engaging the wedge-shaped head of the circuit-closer when electrically operated, and passing between the spaces in the latch-bar when non-electrically operated, the said latch-bar being laterally adjustable, and operating on the end of the said hooked plunger-bar guide, as described.

10. In a convertible electric type-writing machine, the combination of a key-lever having variable fulcrum-apertures, a slotted lever pivoted to said key-lever, a pin or rod for locking and unlocking the said vertical lever from engagement with the said key-lever, a vertical offset or type-bar-actuating lever, having a slot in its lower end, a hooked slotted end concave bar or rod movably engaging in the slot on the lower end of the said offset type-bar lever, below its fulcrum, a ball-bearing guide for the said hooked rod, a sliding wedge-shaped contact-lever-operated foot, or circuit-closer, a spring-depressible tongued block on the end of the said key-lever, means for elevating and releasing the said circuit-closer, projecting angular or wedge-shaped terminal contact plates or bars for engagement with the said circuit-closer, a hooked plate or channel-bar for disengaging the circuit-closer and operating the levers, means for adjusting the stroke of the said hooked or channel plate, an electric magnet in circuit and armatures having spindles or bars operating in ball-bearing guide-boxes, a return-stroke magnet connected to the said hooked plate or channel, to return the said hooked or channel plate to a normal position, when against the armatures of the operating-magnets, an insulated adjustable and spring-cushioned circuit-closer on the said hooked or channel plate, a terminal block on the said magnet opposite the poles thereof, and connected to an electric source, and rods passing through concave ball-bearing guide-blocks connected to the armature and said channel-plate, a latch or detent for locking and unlocking the circuit-closing device, as described.

11. In a convertible electric type-writing machine, the combination of a series of type-bars and connecting-links, a key-lever having changeable fulcrum-points, a slotted curved or angular arm having an aperture or apertures corresponding to the fulcrum-points, a pivot connecting the said vertical lever with the said key-lever, means for securing the said vertical lever at one of the said fulcrum-points of the said key-lever for electric and non-electric operation, a spring-cushioned sliding-tongued compressible block at one end of the said key-lever, a vertical slotted typebar-actuating lever, a type-bar carrying the characters to be printed and actuated by the said key-lever having an arm at right angles thereto, and engaging the said vertical lever on the key-lever, and receiving motion therefrom when non-electrically operated, the said offset or arm oscillating in the slot on the said vertical lever on the key-lever, without action when electrically operated, a hooked plunger-bar or draw-rod parallel to the said key-lever for operating the said offset type-bar lever in a slot when electrically actuated, a ball-bearing stationary guide for the hooked bar or rod, a slotted head on one end of the said hooked bar or rod, a combined releasing wedge-shaped shoe and circuit-closer, wedge-shaped terminal contact plates or bars connected to an electric source, a laterally-movable and adjustable toothed latch for engaging and disengaging the said circuit-closing device for locking the said circuit-closing device when electrically operated and adapted to be unlocked when non-electrically operated, means for raising the said circuit-closer, a hooked channel plate or bar for engagement with the upper portion of the wedge-shaped headed circuit-closer, electromagnets for operating the said channel-plate, and armatures connected to the said electromagnets by concave rods and ball-bearing guides, a return-stroke magnet for quickly releasing the hooked channel-plate, an adjustable circuit-closing block, or contact-shoe on the said hooked channel-plate, and a plurality of twisted type-bar-actuating links connected to the upper portion of the offset type-bar lever and the said type-bars, as described.

12. In a front-strike convertible electric type-writing machine, the combination with a platen, a series of type-bars fulcrumed in a segment, a series of twisted links, a series of vertical slotted type-bar-actuating levers with offsets at right angles thereto, a series of key-levers having alterable or changeable fulcrum-points, a series of slotted or angular arms having apertures corresponding to one of the fulcrum-aperatures on the key-levers, a pivot connecting the said vertical levers with the said key-levers, said vertical lever imparting motion to the type-bar lever when non-electrically operated, the said offset or arm oscillating in the slot on the said vertical lever on the key-lever, without imparting motion to other parts when electrically operated, means for securing the said vertical lever on one or more points of the said key-lever for electric and non-electric operation, a spring-cushioned sliding-tongued compressible block at one end of the said key-lever, a hooked plunger bar or rod parallel to the said key-lever, for operating the said offset type-bar lever in a slot when electrically actuated, a ball-bearing stationary guide for the hooked plunger bar or rod, a slotted head on one end of the said hooked rod or plunger, a combined releasing wedge-shaped shoe and circuit-closer, said wedge-shaped shoe or circuit-closer having an upward extension from an insulated contact-shoe, said extension being in a vertical line with the body of the circuit-closing device, which extension admits of engagement by the hooked channel-plate for actuating the parts when electrically operated, wedge-shaped terminal contact plates or bars connected to an electric source, a laterally-movable and adjustable toothed latch for engaging and disengaging the said circuit-closing device, said latch operating to lock the type-bars and their operating-levers when in normal position, and when in operation to unlock and admit the lifting of the type-bars, by the combination of levers, to the platen, means for raising the said circuit-closer, a hooked channel bar or plate for releasing the wedge-shaped head of the circuit-closer, and means for adjusting the stroke thereof, armatures connected to the electromagnets by concave rods and ball-bearing guides, said guides having means for lengthening or shortening the stroke of the hooked channel bar or plate, a return-stroke magnet for quickly returning the hooked channel-plate, and an adjustable circuit-closing block or contact-shoe on the said channel bar or plate, as described.

13. In a front-strike convertible electric type-writing machine, the combination with a platen, a series of type-bars fulcrumed in a segment, a series of twisted links, a series of vertical slotted type-bar-actuating levers with offsets at right angles thereto, a series of type-bar-lever-return spring-supports adjustably connected to the angular slotted bar, said spring-supports having a curved slotted arm or quadrant for screw adjustment of the same, means for adjusting the said spring tension together or independently, a series of key-levers having alterable or changeable fulcrum-points, a series of slotted or angular arms having apertures corresponding to one of the fulcrum-aperatures on the key-levers, a pivot connecting the said vertical levers with the said key-levers, said vertical lever imparting motion to the type-bar lever when non-electrically operated, the said offset or arm oscillating in the slot on the said vertical lever on the key-lever, without imparting motion to the other parts when electrically operated, means for attaching and detaching the said vertical lever to one of the fulcrum-points on the said key-lever, a spring-cushioned sliding-tongued compressible block and stump-joint at one end of the said key-lever, a hooked plunger bar or rod parallel to the said key-lever, for operating the said offset type-bar lever in a slot when electrically actuated, a ball-bearing stationary guide for the hooked plunger-bar, a slotted head on one end of the said hooked rod or plunger, a combined releasing wedge-shaped shoe and circuit-closer, said wedge-shaped shoe or circuit-closer having an upward extension from an insulated contact-shoe, said extension being in a vertical line with the body of the circuit-closing device, which extension admits of engagement by the hooked channel-plate for actuating the parts when electrically operated, wedge-shaped terminal contact plates or bars connected to an electric source, a laterally-movable and adjustable toothed latch for engaging and disengaging the said circuit-closing device, said latch operating to lock the type-bars and their operating-levers when in normal position, and when in operation to unlock and admit the lifting of the type-bars, by the combination of levers, to the platen, means for raising the said circuit-closer, a hooked channel bar or plate for releasing the wedge-shaped head of the circuit-closer, and means for adjusting the stroke thereof, armatures connected to the electromagnets by concave rods and ball-bearing guides, said guides having means for lengthening or shortening the stroke of the hooked channel bar or plate, a return-stroke magnet for quickly returning the hooked channel-plate, and an adjustable circuit-closing block or contact-shoe on the said hooked or channel bar or plate, as described.

In testimony whereof I have hereunto affixed my signature in the presence of two subscribing witnesses.

GEORGE M. KITZMILLER.

Witnesses:
W. M. STONE,
LEON T. SEAWELL.